US008634977B2

(12) United States Patent
Koide

(10) Patent No.: US 8,634,977 B2
(45) Date of Patent: Jan. 21, 2014

(54) DRIVE CONTROLLER FOR CARGO HANDLING VEHICLE

(75) Inventor: Yukikazu Koide, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 574 days.

(21) Appl. No.: 12/945,509

(22) Filed: Nov. 12, 2010

(65) Prior Publication Data

US 2011/0118922 A1 May 19, 2011

(30) Foreign Application Priority Data

Nov. 17, 2009 (JP) ................................. 2009-261926

(51) Int. Cl.
*B60W 20/00* (2006.01)
*B60W 10/06* (2006.01)
*B60W 10/08* (2006.01)
*B60K 6/46* (2007.10)

(52) U.S. Cl.
USPC ............................... 701/22; 701/50; 180/65.8

(58) Field of Classification Search
None
See application file for complete search history.

(56) References Cited

U.S. PATENT DOCUMENTS

| | | | |
|---|---|---|---|
| 5,473,228 A | 12/1995 | Nii | |
| 5,545,928 A | 8/1996 | Kotani | |
| 6,666,022 B1* | 12/2003 | Yoshimatsu et al. | 60/413 |
| 7,728,449 B2 | 6/2010 | Kagoshima et al. | |
| 7,745,947 B2 | 6/2010 | Komiyama et al. | |
| 2008/0093864 A1* | 4/2008 | Kagoshima et al. | 290/40 A |

FOREIGN PATENT DOCUMENTS

| | | |
|---|---|---|
| EP | 1834854 A2 | 9/2007 |
| EP | 1974979 A2 | 10/2008 |
| JP | 07-111709 A | 4/1995 |
| JP | 2003-219501 A | 7/2003 |
| JP | 2005-298163 A | 10/2005 |
| JP | 2008-101440 A | 5/2008 |
| JP | 2008-121659 A | 5/2008 |

OTHER PUBLICATIONS

Japanese Office Action dated Jun. 21, 2011, corresponding to Japanese Patent Application No. 2009-261926.
European Search Report issued on Aug. 29, 2011 for counterpart application EP 10190859.8.

* cited by examiner

Primary Examiner — Michael J Zanelli
(74) Attorney, Agent, or Firm — Sughrue Mion, PLLC

(57) ABSTRACT

A drive controller for a cargo handling vehicle including an engine, a generator motor, a cargo handling pump, a cargo handling actuator, a travel motor, and a battery. The drive controller includes an engine control unit, a rotation speed detection unit, a deviation calculation unit, and a power generation control unit. The engine control unit controls the engine in accordance with a command rotation speed. The rotation speed detection unit detects an actual rotation speed of the engine. The deviation calculation unit calculates a rotation speed deviation of the command rotation speed for the engine and the actual rotation speed of the engine. The power generation control unit controls the generator motor in accordance with the rotation speed deviation so as to limit power generated by the generator motor to drive the travel motor.

7 Claims, 7 Drawing Sheets

DRIVE CONTROLLER FOR CARGO HANDLING VEHICLE

BACKGROUND OF THE INVENTION

The present invention relates to a drive controller for a cargo handling vehicle including an engine, a generator motor, and a travel motor, which are arranged coaxially with one another.

Japanese Laid-Open Patent Publication No. 2005-298163 describes a prior art example of a drive controller for a cargo handling vehicle. The cargo handling vehicle includes an engine, a generator-motor, and a cargo handling pump, which are arranged so as to be coaxial to one another. The cargo handling vehicle also includes a travel motor, which is used when the vehicle travels, and a battery, which supplies power to the generator motor and travel motor. The cargo handling vehicle switches the operation modes of the generator-motor between generator mode and motor mode. More specifically, when a cargo handling operation does not require a high output, the generator-motor is switched to the generator mode, and the pump is driven by the engine. When a cargo handling operation requires a high output, the generator-motor is switched to the motor mode.

When such a cargo handling vehicle of the prior art travels, the generator motor often generates power to drive the travel motor. When the cargo handling vehicle climbs up a slope while carrying cargo at the maximum load, the power used to drive the travel motor increases. This increases the power required to be generated by the generator motor. When such cargo handling is performed as the cargo handling vehicle travels, the cargo handling load and power generation load applied to the engine may lower the cargo handling speed. Thus, when the cargo handling vehicle travels while handling cargo, the generator motor and travel motor must be controlled so that such a problem does not occur.

SUMMARY OF THE INVENTION

It is an object of the present invention to provide a controller for a cargo handling vehicle allowing for the cargo handing vehicle to travel while handling cargo in a desirable manner.

One aspect of the present invention is a drive controller for a cargo handling vehicle including an engine, a generator motor, a cargo handling pump arranged coaxially with the engine and the generator motor, a cargo handling actuator driven through an operational oil from the cargo handling pump, a travel motor used when the cargo handling vehicle travels, and a battery supplying drive power to the generator motor and the travel motor. The drive controller includes an engine control unit that determines a command rotation speed for the engine and controls the engine in accordance with the command rotation speed. A rotation speed detection unit that detects an actual rotation speed of the engine. A deviation calculation unit calculates a rotation speed deviation of the command rotation speed for the engine and the actual rotation speed of the engine. A power generation control unit controls the generator motor in accordance with the rotation speed deviation so as to limit power generated by the generator motor to drive the travel motor.

When the cargo handling vehicle travels, the generator motor generates electric power to drive the travel motor. The engine produces rotation to obtain the required power. In this state, operation of an operation unit such as a cargo handling lever drives a cargo handling actuator. This applies a cargo handling load to the engine in addition to the power generation load and thereby lowers the engine rotation speed. As the cargo handling load increases, the engine rotation speed decreases. This increases the deviation between the command rotation speed for the engine and the actual rotation speed of the engine. When the engine rotation speed is decreased by a large amount, the drive speed (cargo handling speed) of the cargo handling actuator may decrease. Accordingly, the present invention detects the actual rotation speed of the engine, detects the deviation between the command rotation speed for the engine and the actual rotation speed of the engine, and limits the generated power of the generator motor to drive the travel motor in accordance with the deviation. This lowers the power generation load applied to the engine in accordance with the deviation. Accordingly, decrease in the engine rotation speed is suppressed, and the cargo handling speed is prevented from decreasing. This realizes the cargo handing vehicle to travel and handle a cargo at the same time.

Preferably, the power generation control unit controls the generator motor so as to decrease the power generated by the generator motor as the rotation speed deviation increases.

Preferably, the drive controller further includes a determination unit that determines whether or not the rotation speed deviation is less than a predetermined value. The power generation control unit controls the generator motor so as to limit the power generated by the generator motor when the determination unit determines that the rotation speed deviation is less than the predetermined value.

When the cargo handling load is not so high and the decrease in the engine rotation speed is not so large, the cargo handling performance may be maintained just by limiting the power generated by the generator motor to drive the travel motor. Accordingly, when the deviation between the command rotation speed for the engine and the actual rotation speed of the engine is smaller than the predetermined value, it is preferable that the power generated by the generator motor to drive the travel motor be limited.

Preferably, the drive controller further includes a first assistance control unit for controlling the generator motor so that the generator motor assists the engine in driving the cargo handling pump when the determination unit determines that the rotation speed deviation is greater than the predetermined value.

When the cargo handing load significantly increases and the engine rotation speed thereby significantly decreases, to maintain the cargo handling performance, just the limiting of the power the generator motor generates to drive the travel motor becomes insufficient. In this case, the generator motor assists the engine in driving the cargo handling pump in accordance with the deviation between the command rotation speed for the engine and the actual rotation speed of the engine to suppress large decreases in the engine rotation speed.

Preferably, the first assistance control unit controls the generator motor so that an assistance amount of the generator motor increases as the rotation speed deviation increases.

Preferably, the first assistance control unit controls the generator motor so that sum of drive power for the travel motor and drive power for the generator motor does not exceed a discharge power limit value of the battery.

When the generator motor assists the engine in driving the cargo handling pump, the battery supplies the generator motor and the travel motor with drive power. Thus, a margin, or surplus amount, for the battery discharge power must be taken into consideration. Accordingly, by controlling the generator motor so that sum of the drive power for the travel motor and the drive power for the generator motor does not exceed a discharge power limit value of the battery, the cargo handling vehicle may travel and handle a cargo at the same time without exceeding the discharge power limit value of the battery that changes in accordance with factors such as the temperature and state of charge of the battery.

Preferably, the drive controller further includes a second assistance control unit that controls the generator motor so that the generator motor assists the engine in driving the cargo handling pump when the actual rotation speed of the engine becomes lower than an idle rotation speed.

In this case, when the actual rotation speed of the engine becomes lower than the idle rotation speed, the generator motor assists the engine in driving the cargo handling pump. This increases the rotation speed of the engine and prevents the engine from stalling.

Preferably, the drive controller further includes a travel control unit that controls the travel motor so that sum of drive power for the travel motor and drive power for the generator motor does not exceed a discharge power limit value of the battery.

For example, when the generator motor is performing cargo handling assistance, depression of the accelerator pedal drives the travel motor so that the cargo handling vehicle travels. In this case, the battery supplies the generator motor and travel motor with drive power. Thus, the surplus amount of the battery discharge power must be taken into consideration. Accordingly, by controlling the travel motor so that drive power for the travel motor and drive power for the generator motor does not sum to a value exceeding a discharge power limit value of the battery, the cargo handling vehicle may travel and handle a cargo at the same time without exceeding the discharge power limit value of the battery that changes in accordance with factors such as the temperature and state of charge of the battery.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Drive controllers for a cargo handling vehicle according to preferred embodiments of the present invention will be discussed in detail with reference to the drawings.

Figure 1:
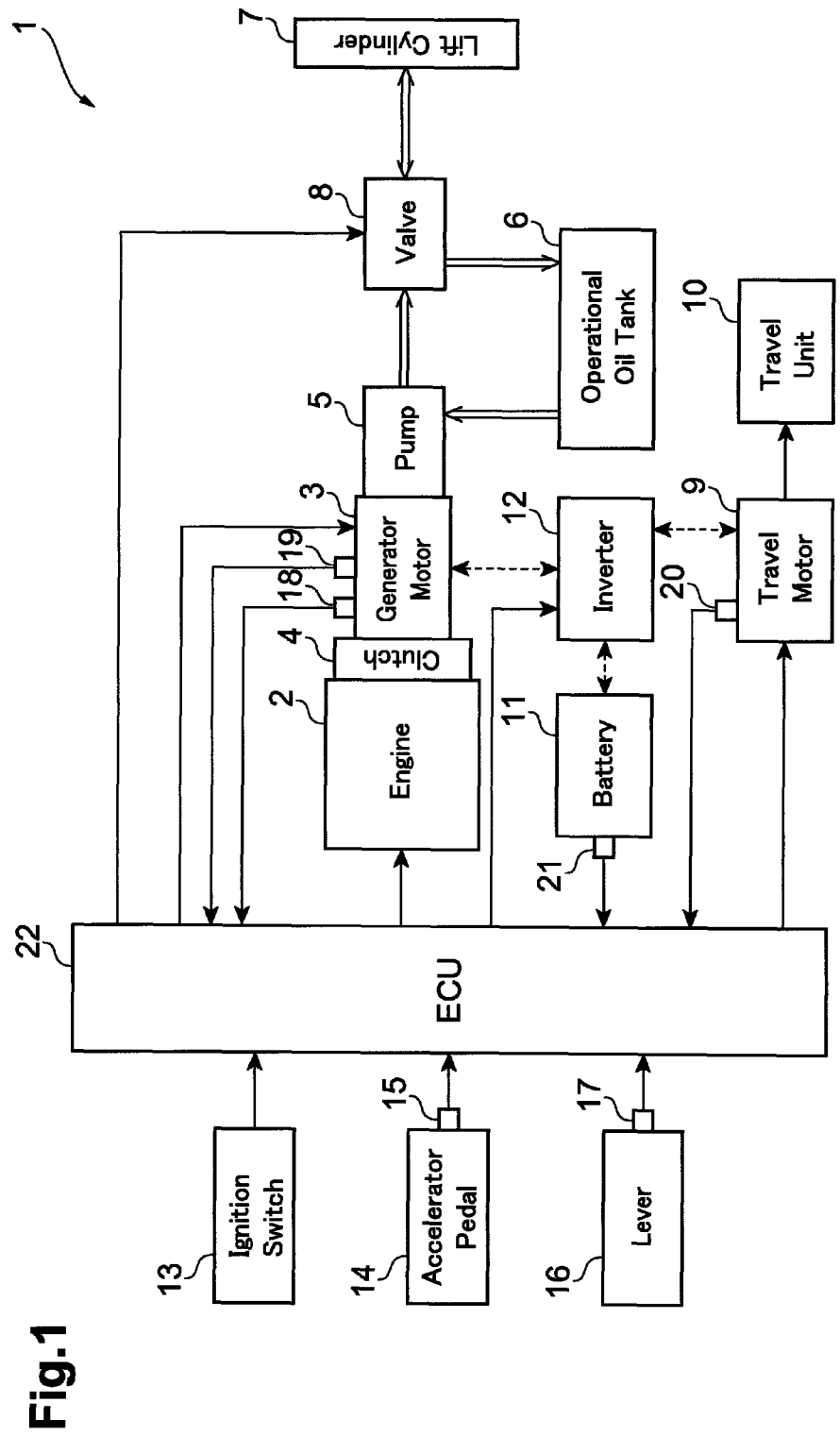
FIG. 1 is a schematic block diagram showing the structure of a hybrid forklift including a drive controller according to a first embodiment of the present invention.

FIG. 1 is a schematic block diagram showing the structure of a hybrid forklift 1, which serves as a cargo handling vehicle, including a drive controller according to a first embodiment of the present invention. As shown in FIG. 1, the hybrid forklift 1 includes an engine 2, a generator motor 3, and a clutch 4. The engine 2 includes a mechanical or electronic governor (not shown). The generator motor 3 is coaxially coupled by a drive shaft (not shown) to the engine 2. The clutch 4 is arranged between the engine 2 and the generator motor 3.

The generator motor 3 operates in a generator mode as a generator, which is rotated and driven by the engine 2 to generate power. Further, the generator motor 3 operates in a motor mode as a motor. The operation mode of the generator motor 3 is selected by a mode switching signal, which is provided by an electronic control unit (ECU) 22.

The forklift 1 includes a cargo handling pump 5, an operational oil tank 6, a lift cylinder (cargo handling actuator) 7, and a cargo handling valve 8. The pump 5 is coaxially connected by a drive shaft (not shown) to the engine 2 and the generator motor 3. The operational oil tank 6 is connected to the cargo handling pump 5. The lift cylinder 7 lifts and lowers a fork (not shown). The valve 8 is arranged between the pump 5 and the lift cylinder 7.

The pump 5, which is driven by the engine 2 and the generator motor 3, draws in operational oil from the operational oil tank 6 and discharges the oil. The oil discharged from the pump 5 drives the lift cylinder 7. In accordance with an open amount command signal from the ECU 22, the valve 8 controls the direction and the flow rate of the operational oil flowing between the pump 5 and the lift cylinder 7.

The forklift 1 includes a travel motor 9 and a travel unit 10. The travel unit 10 drives the forklift 1 when the forklift 1 travels.

Further, the forklift 1 includes a battery 11 and an inverter 12 (power converter), which is connected to the battery 11. The battery 11 may be a nickel-metal hydride battery, a lithium-ion battery, a lead-acid battery, or the like. The inverter 12 stores the electric power generated by the generator motor 3 operating in the generator mode. The inverter 12 also supplies the generator motor 3 and the travel motor 9 with power from the battery 11 when the generator motor 3 and the travel motor 9 operate in the motor mode. The ECU 22 generates a mode switching signal and a drive command signal to control the charging and discharging of the battery 11.

The forklift 1 also includes an ignition switch 13, an accelerator pedal 14, an accelerator depression amount sensor 15, a cargo handling lever 16, a lever sensor 17, a rotation speed sensor 18, a generator motor power detector 19, a travel motor power detector 20, a battery state detector 21, and the ECU 22. The ignition switch 13 is used to start the engine 2. The accelerator depression amount sensor 15 detects the depressed amount of the accelerator pedal 14. The lever sensor 17 detects the operated amount of the lever 16. The rotation speed sensor 18 detects the actual speed of the rotation produced by the generator motor 3, namely, the actual generator motor rotation speed. The generator motor power detector 19 detects the output power of the generator motor 3, namely, the generator motor power. The travel motor power detector 20 detects the output power of the travel motor, namely, the travel motor power. The battery state detector 21 detects the state of the battery 11, such as the temperature and state of charge of the battery 11. The lever 16 is a lift lever used to drive and operate the lift cylinder 7.

The ECU 22 controls the systems for the entire forklift 1. The ECU 22 receives an ON/OFF signal from the ignition switch 13 and detection signals from the accelerator depression amount sensor 15, the lever sensor 17, the rotation speed sensor 18, the generator motor power detector 19, the travel motor power detector 20, and the battery state detector 21 to perform predetermined processes and send various signals to the engine 2, the generator motor 3, the valve 8, the travel motor 9, and the inverter 12. More specifically, the ECU 22 sends drive command signals to the engine 2, the generator motor 3, and the travel motor 9. The ECU 22 also sends an open amount command signal to the valve 8 in accordance with an operated amount (operational angle) of the lever 16 and a mode switching signal to the inverter 12 in accordance with the generator mode and the motor mode. Further, the ECU 22 sends drive command signals to the generator motor 3 and the travel motor 9.

Figure 2A:
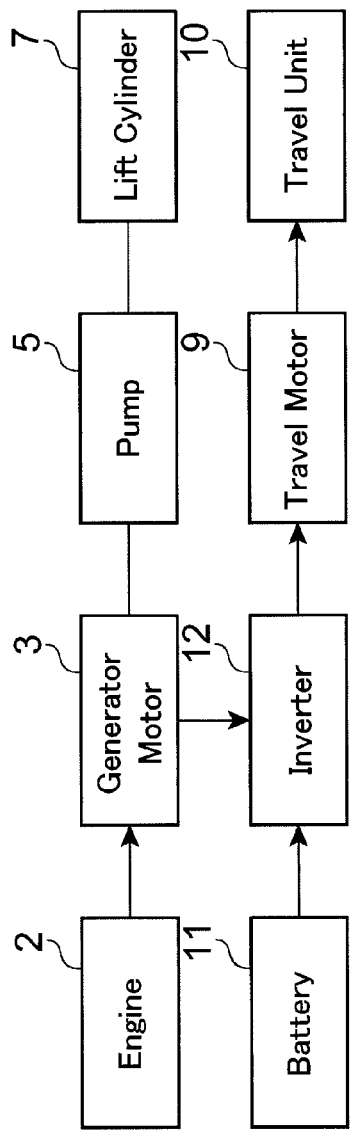
FIGS. 2A to 2C are schematic diagrams showing the flow of power when the forklift shown in FIG. 1 travels and handles cargo.
Figure 2B:
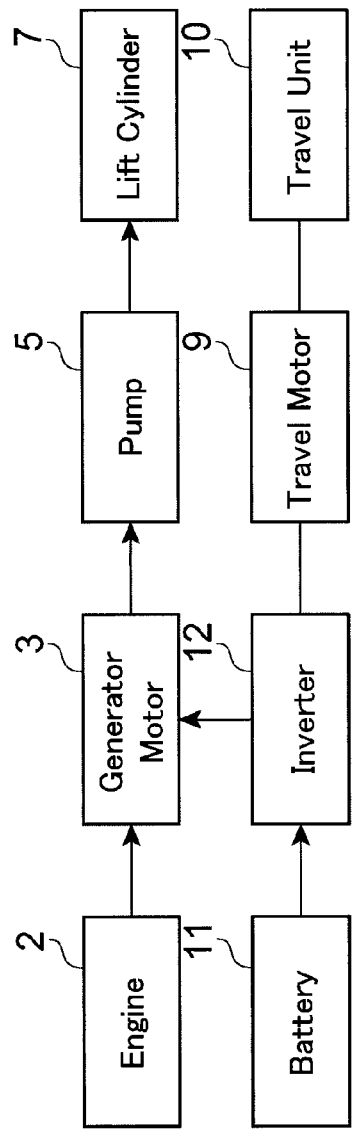
Figure 2C:
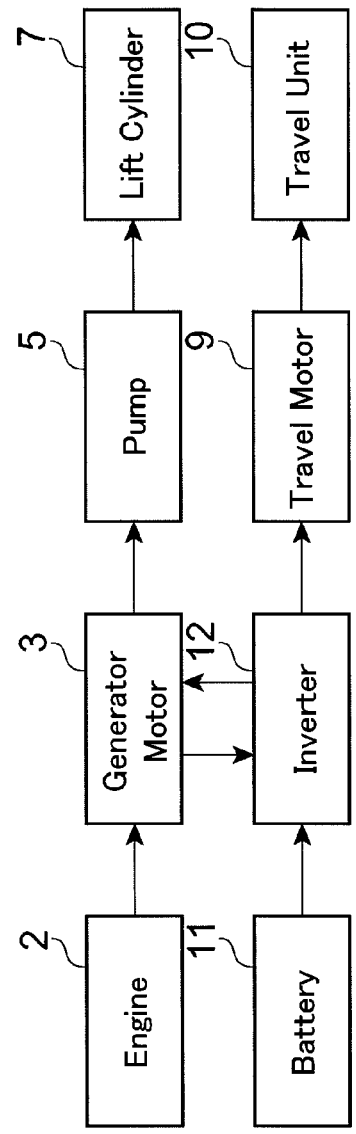

FIGS. 2A to 2C are schematic diagrams showing the flow of power when the forklift 1 travels and handles cargos. FIG. 2A shows the flow of power when the forklift 1 is just traveling. FIG. 2B shows the flow of power when the forklift 1 is just handling cargo. FIG. 2C shows the flow of power when the forklift 1 simultaneously travels and handles cargo.

When the forklift 1 is just traveling as shown in the state of FIG. 2A, the generator motor 3 operates in the generator mode and generates power to supplement the power for driving the travel motor 9. In this case, the battery 11 is mainly charged by regenerative power generated when the forklift 1 travels and is discharged when a delay occurs in the output of the engine 2.

When the forklift 1 is only handling cargo as shown in the state of FIG. 2B, the force required to drive the pump 5 is mainly generated by the engine 2. When the cargo handling load is low or when the cargo handling operation is stopped, the generator motor 3 operates in the generator mode and charges the battery 11. When the cargo handling load is high, the generator motor 3 operates in the motor mode and assists the output of the engine 2.

When the forklift 1 simultaneously travels and handles cargo as shown in the state of FIG. 2C, the force required for driving the travel motor 9 and the pump 5 is generated by the engine 2 and the generator motor 3, which is operated in the motor mode.

Figure 3:
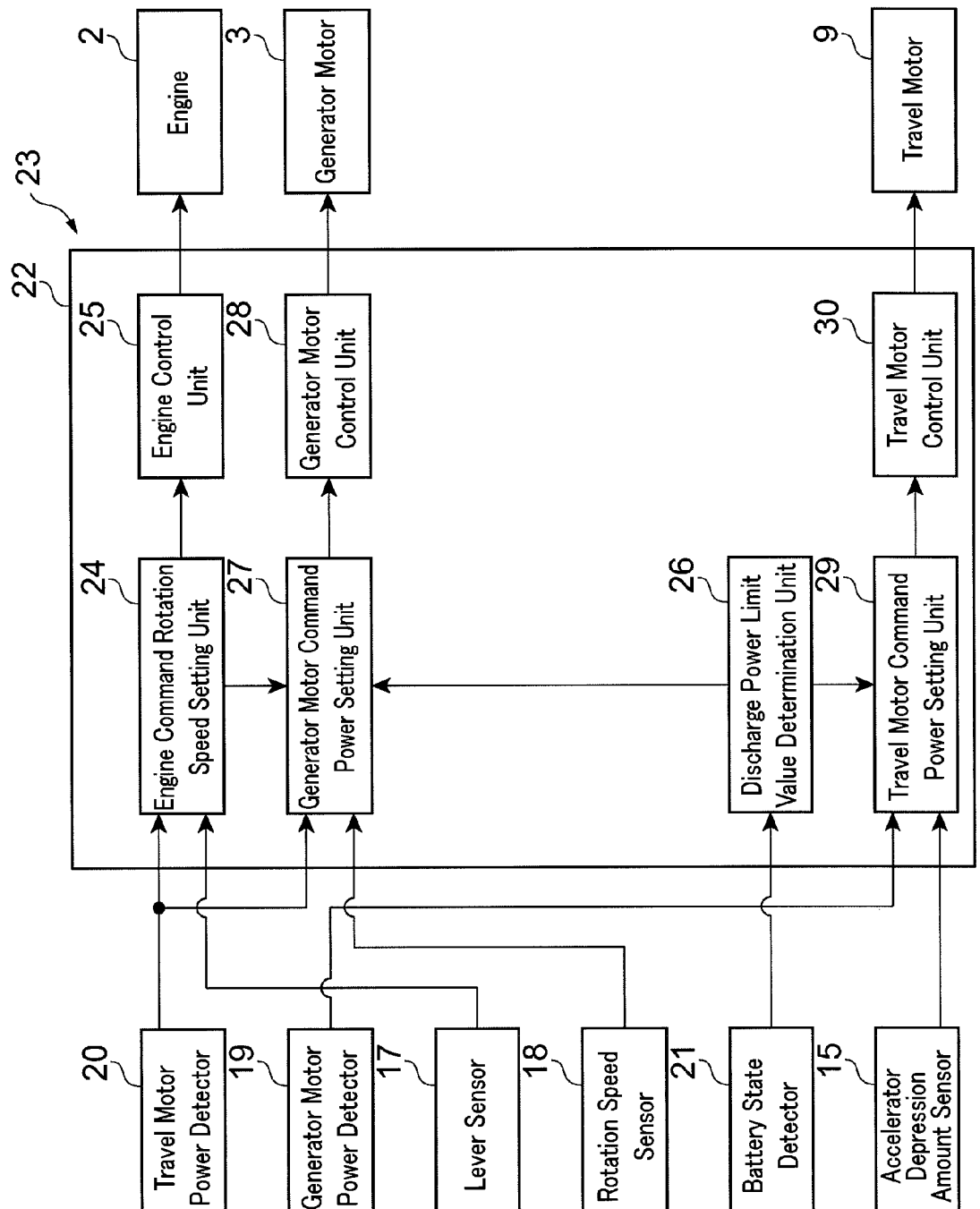
FIG. 3 is a block diagram of functional blocks in an ECU of FIG. 1.

FIG. 3 shows the functional blocks of the ECU 22 of FIG. 1. As show in FIG. 3, a drive controller 23 of the present embodiment includes the accelerator depression amount sensor 15, the lever sensor 17, the rotation speed sensor 18, the generator motor power detector 19, the travel motor power detector 20, the battery state detector 21, and the ECU 22.

The ECU 22 includes an engine command rotation speed setting unit 24, an engine control unit 25, a discharge power limit value determination unit 26, a generator motor command power setting unit 27, a generator motor control unit 28, a travel motor command power setting unit 29, and a travel motor control unit 30.

The rotation speed setting unit 24 obtains an engine command rotation speed required for the engine 2 based on the detection values of the lever sensor 17 and the travel motor power detector 20. Specifically, from a travel request rotation speed, which is the rotation speed required for the forklift 1 to travel, and a cargo handling request rotation speed, which is the rotation speed required for the forklift 1 to handle cargo, the rotation speed setting unit 24 selects and sets the larger one as the engine command rotation speed.

The travel request rotation speed is obtained from a travel request rotation speed map (not shown) showing the relationship between a travel request power and the travel request rotation speed. The travel request power is calculated using the travel motor power detected by the travel motor power detector 20 from the equation shown below. The generation power is negative (−). Thus, the travel request power, which is the generation power required for the forklift 1 to travel, is negative.

$$\text{Travel Request Power} = (-1) \times \text{Travel Motor Power} \qquad (A)$$

The cargo handling request rotation speed is obtained from a cargo handling request rotation speed map (not shown) representing the relationship between the operated amount of the lever 16 and the cargo handling request rotation speed.

The engine control unit 25 outputs a drive command signal, which is in correspondence with the engine command rotation speed, to a throttle actuator (not shown) of the engine 2.

The discharge power limit value determination unit 26 determines the discharge power limit value of the battery 11 based on factors such as the temperature and state of charge of the battery 11.

The generator motor command power setting unit 27 obtains a normal generator motor command power based on the engine command rotation speed, the detection values of the rotation speed sensor 18 and travel motor power detector 20, and the discharge power limit value. The generator motor command power setting unit 27 also obtains an engine stall prevention command power based on the detection value from the rotation speed sensor 18.

Figure 4:
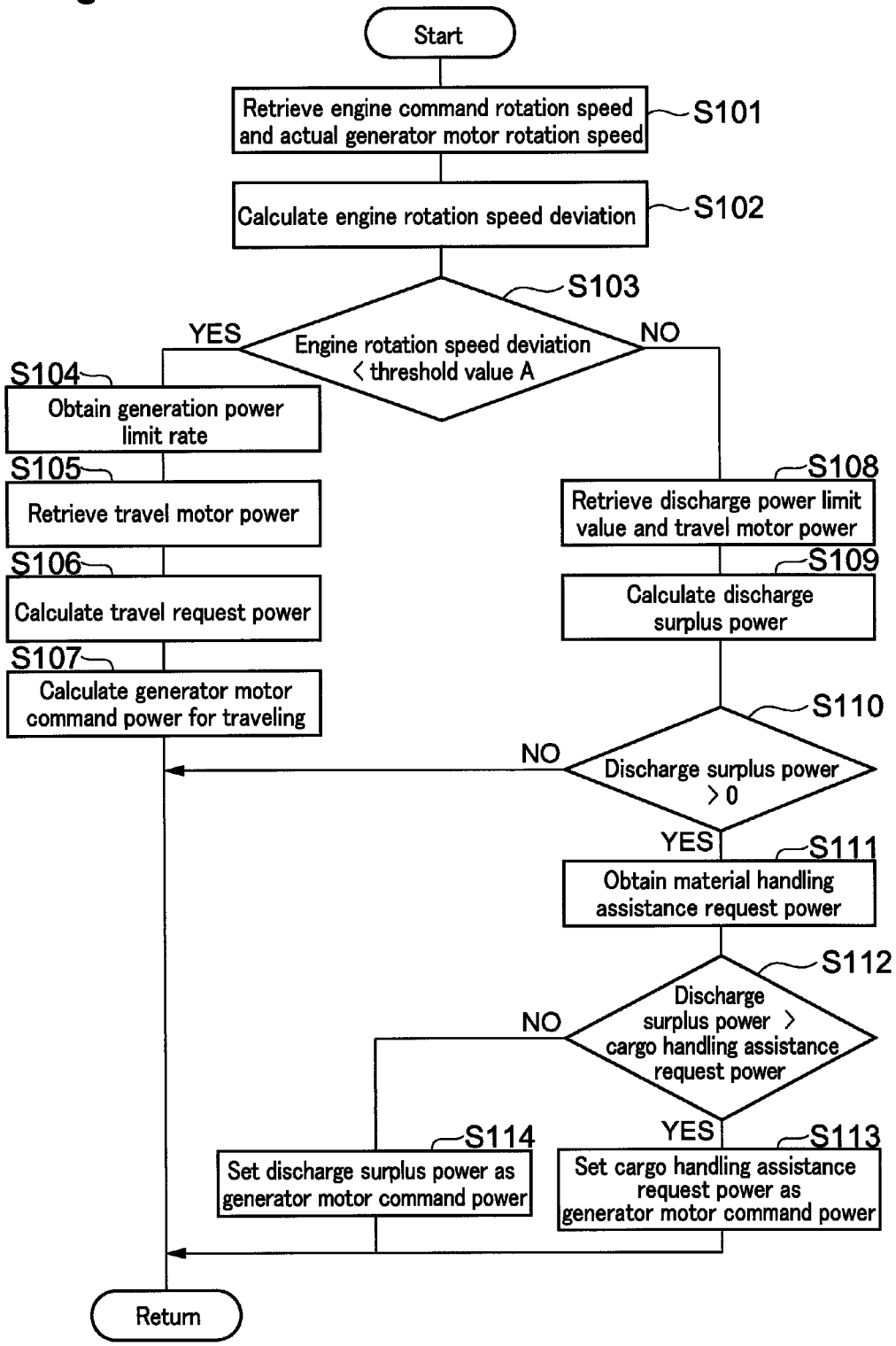
FIG. 4 is a flowchart showing a generator motor command power setting process executed by a generator motor command power setting unit shown in FIG. 3.

FIG. 4 is a flowchart showing a process executed by the generator motor command power setting unit 27. In the present process, the clutch 4 is in a constantly connected state.

As shown in FIG. 4, the power setting unit 27 first retrieves the engine command rotation speed obtained by the rotation speed setting unit 24 and the actual generator motor rotation speed detected by the rotation speed sensor 18 (step S101). Since the engine 2 and the generator motor 3 are arranged coaxially with each other, the actual generator motor rotation speed is equal to the actual rotation speed of the engine 2, or the actual engine rotation speed. Thus, the actual engine rotation speed may be directly detected instead of the actual generator motor rotation speed.

An engine rotation speed deviation is then calculated with the equation shown below (step S102).

$$\text{Engine Rotation Speed Deviation} = \text{Engine Command Rotation Speed} - \text{Actual Generator Motor Rotation Speed}$$

Figure 5A:
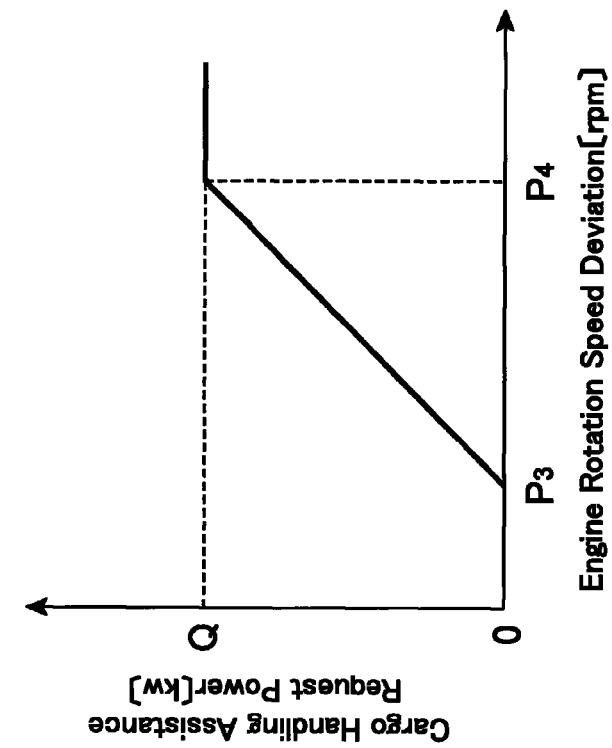
FIGS. 5A and 5B are graphs respectively an example of a generation power limit rate map and a cargo handling assistance request power map used by the generator motor command power setting unit of FIG. 3.

The power setting unit 27 then determines whether or not the engine rotation speed deviation is less than a predetermined threshold value A (step S103). When determined that the engine rotation speed deviation is less than the threshold value A, the power setting unit 27 uses a generation power limit rate map, which is shown in FIG. 5A, to obtain a generation power limit rate in correspondence with the engine rotation speed deviation (step S104).

The generation power limit rate map shows the relationship between the engine rotation speed deviation and the generation power limit rate. The generation power limit map shown in FIG. 5A is set such that the generation power limit rate is 100% until the engine rotation speed deviation becomes P1 rpm. When the engine rotation speed deviation exceeds P1 rpm, the generation power limit rate decreases in proportion to the engine rotation speed deviation. When the engine rotation speed deviation becomes greater than or equal to P2 (>P1) rpm, the generation power limit rate is set to be 0%.

The power setting unit 27 then retrieves the travel motor power detected by the travel motor power detector 20 (step S105). Further, the power setting unit 27 calculates the travel request power using the above-described equation (A) (step S106).

The power setting unit 27 then uses the generation power limit rate and travel request power to calculate the generator motor command power through the following equation (step S107). The generator motor command power in this state is the command generation power that operates the generator motor 3 in the generator mode to drive the travel motor 9.

Generator Motor Command Power=Travel Request Power×Generation Power Limit Rate/100

When determining that the engine rotation speed deviation is greater than or equal to the threshold value A in step S103, the power setting unit 27 retrieves the discharge power limit value and the travel motor power (step S108). Then, the power setting unit 27 uses the discharge power limit value and the travel motor power to calculate a discharge surplus power with the equation shown below (step S109).

Discharge Surplus power=Discharge Power Limit Value−Travel Motor Power

Figure 5B:
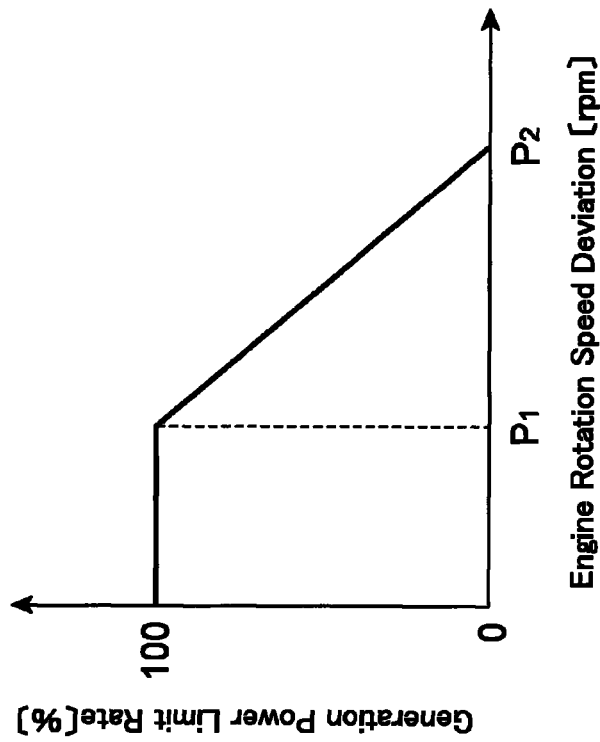

Subsequently, the power setting unit 27 determines whether or not the discharge surplus power is greater than zero (step S110). When the discharge surplus power is less than or equal to zero, the power setting unit 27 ends the present process. When the discharge surplus power is greater than zero, the power setting unit 27 obtains a cargo handling assistance request power that corresponds to the engine rotation speed deviation from a cargo handling assistance request power map shown in FIG. 5B (step S111).

The cargo handling assistance request power map shows the relationship between the engine rotation speed deviation and the cargo handling assistance request power. The cargo handling assistance request power map is set so that the cargo handling assistance request power increases in proportion to the engine rotation speed deviation from 0 kW when the engine rotation speed deviation exceeds P3 (>P2) rpm. As the engine rotation speed deviation becomes greater than or equal to P4 (>P3) rpm, the cargo handling assistance request power becomes constant at Q kW.

The power setting unit 27 then determines whether or not the discharge surplus power is greater than the cargo handling assistance request power (step S112). When the discharge surplus power is greater than the cargo handling assistance request power, the power setting unit 27 sets the cargo handling assistance request power as the generator motor command power (step S113). When the discharge surplus power is less than or equal to the cargo handling assistance request power, the power setting unit 27 sets the discharge surplus power as the generator motor command power (step S114). The generator motor command power determined in step S113 or S114 is the command drive power that operates the generator motor 3 in the motor mode to assist the output of the engine 2.

Figure 6:
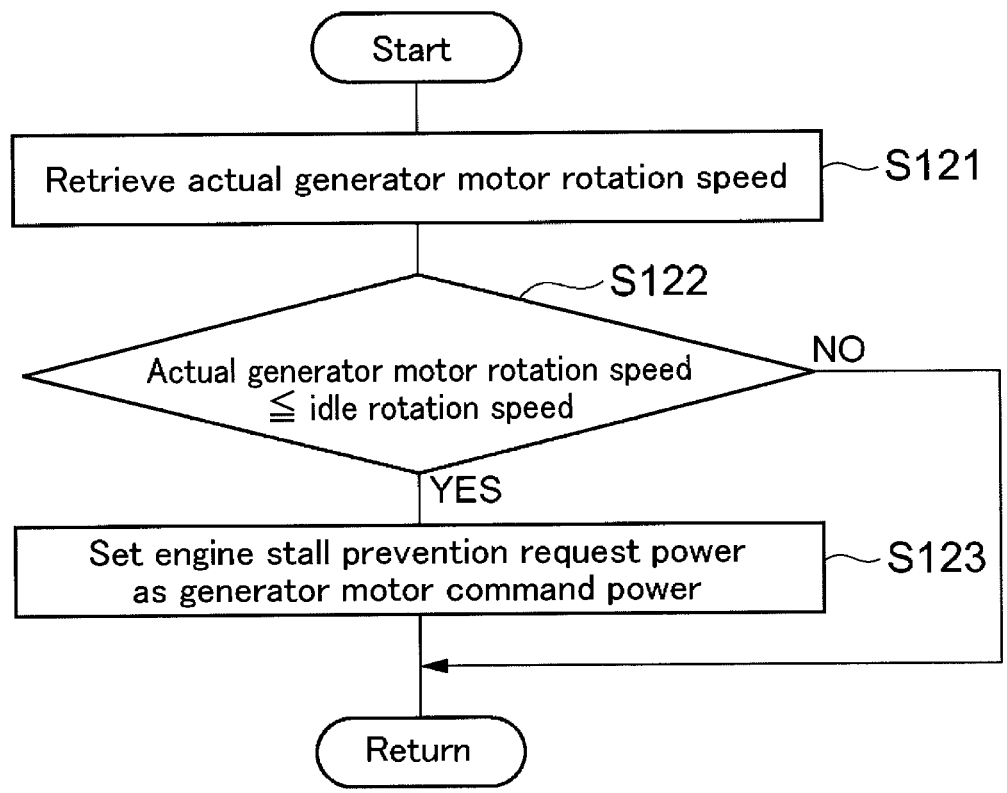
FIG. 6 is a flowchart showing an engine stall prevention command power setting process executed by the generator motor command power setting unit of FIG. 3.

FIG. 6 is a flowchart showing an engine stall prevention command power setting process executed by the power setting unit 27. In the present process, the clutch 4 is also in a constantly connected state.

As shown in FIG. 6, the power setting unit 27 retrieves the actual generator motor rotation speed (actual engine rotation speed) detected by the rotation speed sensor 18 (step S121). The power setting unit 27 then determines whether the actual generator motor rotation speed is less than or equal to an idle rotation speed of, for example, 750 rpm (step S122). When the actual generator motor rotation speed is greater than the idle rotation speed, the power setting unit 27 ends the present process.

Figure 7:
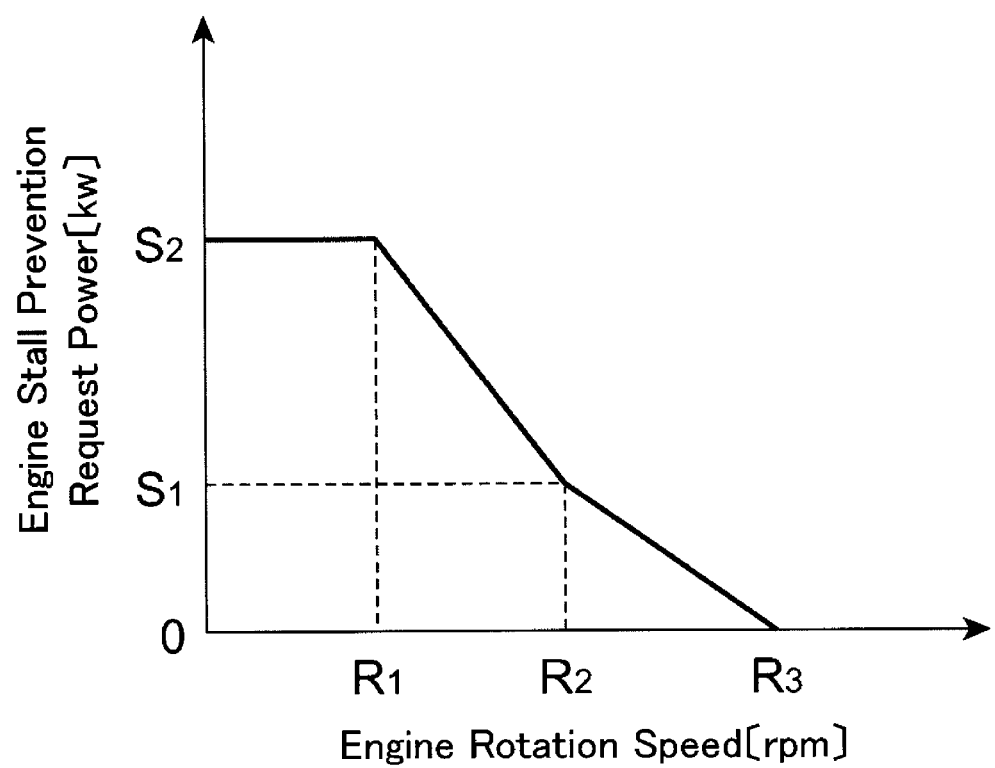
FIG. 7 is a graph showing one example of an engine stall prevention request power map used by the generator motor command power setting unit of FIG. 3.

When the actual generator motor rotation speed is less than or equal to the idle rotation speed, the power setting unit 27 obtains an engine stall prevention request power corresponding to the actual generator motor rotation speed (actual engine rotation speed) from an engine stall prevention request power map shown in FIG. 7. Then, the power setting unit 27 sets the engine stall prevention request power as the generator motor command power (step S123).

The engine stall prevention request power map shows the relationship between the actual engine number rotation and the engine stall prevention request power. The engine stall prevention request power map shown in FIG. 7 is set so that the engine stall prevention request power increases as the actual engine rotation speed decreases when the actual engine rotation speed is R1 to R3 rpm. Further, when the actual engine rotation speed is less than or equal to R1 rpm, the engine stall prevention request power remains constant at S2 kW.

Returning to FIG. 3, the generator motor control unit 28 outputs the drive command signal corresponding to the generator motor command power, which is set by the power setting unit 27 as described above, to the generator motor 3. In this case, the assistance provided by the engine stall prevention request power is performed with priority over the assistance provided by the cargo handling assistance request power when operating the generator motor 3 in the motor mode.

The power setting unit 29 obtains the travel motor command power, which is required for the travel motor 9, based on the detection value of the accelerator depression amount sensor 15, the detection value of the generator motor power detector 19, and the discharge power limit value obtained by the discharge power limit value determination unit 26. The power setting unit 29 obtains the travel motor command power when depression of the accelerator pedal 14 is detected by the accelerator depression amount sensor 15.

In this state, the power setting unit 29 limits the travel motor command power to prevent the discharge power limit value from being exceeded. Specifically, the power setting unit 29 calculates the difference between the discharge power limit value and the generator motor power (discharge power limit value−generator motor power). When the difference is greater than zero, the difference is set as the travel motor command power. When the difference between the discharge power limit value and the generator motor power is less than or equal to zero, the travel motor command power is set as zero.

The travel motor control unit 30 outputs the drive command signal corresponding to the travel motor command power, which is set by the power setting unit 29, to the travel motor 9.

In this manner, the lever sensor 17, the travel motor power detector 20, the rotation speed setting unit 24, and the engine control unit 25 form an engine control unit that determines the command rotation speed of the engine 2 and controls the engine 2 in accordance with the command rotation speed. The rotation speed sensor 18 forms a rotation speed detection unit that detects the actual rotation speed of the engine 2. The generator motor command power setting unit 27 that performs steps S101 and S102 forms a deviation calculation unit that calculates the deviation of the command rotation speed of the engine 2 and the actual rotation speed of the engine 2. The travel motor power detector 20, the generator motor command power setting unit 27 that executes steps S104 to S107, and the generator motor control unit 28 form a power generation control unit that controls the generator motor 3 so as to limit the electric power generated by the generator motor 3 to drive the travel motor 9 in accordance with the deviation of the command rotation speed of the engine 2 and the actual rotation speed of the engine 2.

The generator motor command power setting unit 27 that performs step S103 forms a determination unit for determining whether or not the deviation of the command rotation speed of the engine 2 and the actual rotation speed of the engine 2 is less than a predetermined value. The travel motor power detector 20, the battery state detector 21, the discharge power limit value determination unit 26, the generator motor command power setting unit 27 that performs step S108 to S114, and the generator motor control unit 28 form a first assistance control unit that controls the generator motor 3 to assist the engine 2 in the driving the pump 5 in accordance with the deviation of the command rotation speed of the engine 2 and the actual rotation speed of the engine 2 when the determination unit determines that the deviation of the command rotation speed of the engine 2 and the actual rotation speed of the engine 2 is greater than a predetermined value.

Further, the generator motor command power setting unit 27 that performs steps S121 to S123 and the generator motor control unit 28 form a second assistance control unit that controls the generator motor 3 to assist the engine 2 in driving the pump 5 in accordance with the actual rotation speed of the engine 2 when the actual rotation speed of the engine 2 becomes lower than the idle rotation speed.

The generator motor power detector 19, the battery state detector 21, the discharge power limit value determination unit 26, the power setting unit 29, and the travel motor control unit 30 form a travel control unit that controls the travel motor 9 so that the sum of the drive power of the travel motor 9 and the drive power of the generator motor 3 does not exceed the discharge power limit value of the battery 11.

In the above-described forklift 1, the generator motor 3 basically operates in the generator mode when just performing the traveling operation alone. In this case, the generator motor 3 generates electric power in correspondence with the traveling load. Thus, the engine 2 produces rotation so as to allow for generation of the power. When a lifting operation is carried out in this state, the rotation speed of the engine 2 decreases due to the cargo handling load applied to the engine 2. This increases the deviation of the engine command rotation speed and the actual rotation speed. In this case, the rotation speed of the engine 2 decreases as the cargo handling load increases.

In the present embodiment, the generator motor command power that limits the generation power is set in correspondence with the deviation (engine rotation speed deviation) of the engine command rotation speed and the actual engine rotation speed, and the generator motor 3 is controlled in accordance with the generator motor command power. This reduces the power generation load applied to the engine 2 and minimizes the lowering of the rotation speed of the engine 2. Since the lifting speed (cargo handling speed) does not decrease, the driver would not experience discomfort.

As the engine rotation speed deviation further increases, the generator motor 3 operates in the motor mode to maintain the cargo handling performance. Further, the generator motor command power is set so that the generator motor 3 assists the engine 2 in driving the pump 5 (cargo handling assistance), and the generator motor 3 is controlled in accordance with the generator motor command power. In this case, the power required to drive the travel motor 9 is fully supplied from the battery 11.

Accordingly, the discharge surplus power of the battery 11 is calculated from the difference between the discharge power limit value and the travel motor power. When there is surplus battery discharge power, the cargo handling assistance is performed within the range of the discharge surplus power. When there is no surplus battery discharge power, cargo handling assistance is not performed.

When performing cargo handling under a high load when the forklift 1 is not travelling, the generator motor 3 operates in the motor mode and performs cargo handling assistance. Thus, the battery 11 is being discharged. Depression of the accelerator pedal 14 in this state generates travel motor power. In this case, the travel motor command power is set from the difference between the discharge power limit value and the generator motor power so that the sum of the travel motor power and the generator motor power does not exceed the discharge power limit value. The driving of the travel motor 9 is limited by controlling the travel motor 9 in accordance with the travel motor command power.

When the forklift 1 is just traveling, the travel motor command power is set based on the difference between the discharge power limit value and the generator motor power so that the travel motor power does not exceed the discharge power limit value. This limits the driving of the travel motor 9.

Further, when the actual engine rotation speed becomes lower than the idle rotation speed, the engine stall prevention request power is set in correspondence with the actual engine rotation speed, and the generator motor 3 is controlled in accordance with the engine stall prevention request power. In this manner, the generator motor 3 performs engine stall prevention assistance.

As described above, when a cargo handling load is applied to the traveling forklift 1, the present embodiment decreases the electric power generated by the generator motor 3 as the deviation increases between the engine command rotation speed and the actual engine rotation speed. This prevents the rotation speed of the engine 2 from decreasing and prevents the cargo handling speed from decreasing. As a result, the forklift 1 may travel and handle cargos at the same time without lowering the cargo handling performance.

The driving of the travel motor 9 and the generator motor 3 is limited so that the sum of the travel motor power and the generator motor power does not exceed the discharge power limit value. Thus, the forklift 1 may travel and handle cargos at the same time while using as much electric power as possible within the range of the discharge power limit value.

Since the forklift 1 allows for traveling and cargo handling to be performed at the same time in a desirable manner, the power necessary for the traveling load and the cargo handling load is obtained without any need for enlarging the engine. Thus, fuel efficiency may be increased by using a smaller engine.

When the rotation speed of the engine 2 becomes lower than the idle rotation speed, the assistance performed by the generator motor 3 is given the highest priority. This prevents engine stalls even when, for example, the rotation speed of the engine 2 is low and a sudden load fluctuation further decreases the rotation speed.

Further, the discharge power limit value varied by the temperature and state of charge is always ensured. This protects the battery 11. Moreover, the generator motor command power is obtained by calculating the deviation of the engine command rotation speed and the actual generator motor rotation speed. This eliminates the need for additional components, such as a pressure sensor for detecting and estimating the cargo handling load, and thereby lowers cost.

The present invention is not limited to the above-discussed embodiment. For example, the above-discussed embodiment is applied to the forklift 1 when lifting the fork to handle cargo. However, the present invention may also be applied, for example, when tilting a fork in forward and rearward directions to handle cargo or when operating other attachments such as a rotational clamp.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A drive controller for a cargo handling vehicle including an engine, a generator motor, a cargo handling pump arranged coaxially with the engine and the generator motor, a cargo handling actuator driven through an operational oil from the cargo handling pump, a travel motor used when the cargo handling vehicle travels, and a battery supplying drive power to the generator motor and the travel motor, the drive controller comprising:
    an engine control unit that determines a command rotation speed for the engine and controls the engine in accordance with the command rotation speed;
    a rotation speed detection unit that detects an actual rotation speed of the engine;
    a deviation calculation unit that calculates a rotation speed deviation of the command rotation speed for the engine and the actual rotation speed of the engine;
    a power generation control unit that controls the generator motor in accordance with the rotation speed deviation so as to limit power generated by the generator motor to drive the travel motor; and
    a determination unit that determines whether or not he rotation speed deviation is less than a predetermined value,
    wherein the power generation control unit controls the generator motor as to limit the power generated by the generator motor when the determination unit determines that the rotation speed deviation is less than the predetermined value.

2. The drive controller according to claim 1, wherein the power generation control unit controls the generator motor so as to decrease the power generated by the generator motor as the rotation speed deviation increases.

3. The drive controller according to claim Maim 1, further comprising:
    a first assistance control unit for controlling the generator motor so that the generator motor assists the engine in driving the cargo handling pump when the determination unit determines that the rotation speed deviation is greater than the predetermined value.

4. The drive controller according to claim 3, wherein the first assistance control unit controls the generator motor so that an assistance amount of the generator motor increases as the rotation speed deviation increases.

5. The drive controller according to claim 3, wherein the first assistance control unit controls the generator motor so that sum of drive power for the travel motor and drive power for the generator motor does not exceed a discharge power limit value of the battery.

6. The drive controller according to claim 1, further comprising a second assistance control unit that controls the generator motor so that the generator motor assists the engine in driving the cargo handling pump when the actual rotation speed of the engine becomes lower than an idle rotation speed.

7. The drive controller according to claim 1, further comprising:
    a travel control unit that controls the travel motor so that sum of drive power for the travel motor and drive power for the generator motor does not exceed a discharge power limit value of the battery.

* * * * *